(12) United States Patent
Zhao et al.

(10) Patent No.: US 6,562,520 B1
(45) Date of Patent: May 13, 2003

(54) POLYMER ELECTROLYTE AND RECHARGEABLE CELL COMPRISING THE SAME

(75) Inventors: Jinbao Zhao, Ibaraki (JP); Kiyoshi Sato, Ibaraki (JP); Ryo Nagai, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 167 days.

(21) Appl. No.: 09/717,113

(22) Filed: Nov. 22, 2000

(30) Foreign Application Priority Data

Nov. 22, 1999 (JP) .......................... 11-331339
Mar. 13, 2000 (JP) ...................... 2000-068030

(51) Int. Cl.$^7$ ........................... H01M 6/18; H01M 4/58
(52) U.S. Cl. ............ 429/314; 429/231.8; 429/231.95; 429/306; 429/309
(58) Field of Search ................. 429/300, 304, 429/306, 314, 309, 231.8, 231.95

(56) References Cited

U.S. PATENT DOCUMENTS

| | | | | |
|---|---|---|---|---|
| 4,835,074 A | * | 5/1989 | Bolster et al. | 429/43 |
| 4,844,995 A | * | 7/1989 | Noda et al. | 429/189 |
| 5,300,374 A | * | 4/1994 | Agrawal et al. | 429/192 |
| 5,424,151 A | * | 6/1995 | Koksbang et al. | 429/213 |

FOREIGN PATENT DOCUMENTS

| | | | | |
|---|---|---|---|---|
| JP | 10125306 | | 5/1998 | |
| JP | 2000-149991 | * | 5/2000 | H01M/10/40 |

* cited by examiner

*Primary Examiner*—Patrick Ryan
*Assistant Examiner*—Julian Mercado
(74) *Attorney, Agent, or Firm*—Birch, Stewart, Kolasch & Birch, LLP

(57) ABSTRACT

A polymer electrolyte comprising an electrolyte salt, a non-aqueous solvent and a polymer which comprises repeating units of the formulas: —$(R^1$—$O)_n$—, and —$[CH(R^2)$—$CH_2$—$O]_m$— in which $n \geq 0$ and $m \geq 0$ provided that $n+m \geq 5$, $R^1$ is a $C_1$–$C_6$ alkyl group, and $R^2$ is a $C_1$–$C_6$ alkyl group or a benzyl group, and a urea structure.

9 Claims, No Drawings

POLYMER ELECTROLYTE AND RECHARGEABLE CELL COMPRISING THE SAME

FIELD OF THE INVENTION

The present invention relates to a polymer electrolyte, which can be used in electrochemical equipment such as cells, capacitors, etc., prevent the liquid leakage, and is easily produced, and a rechargeable cell comprising the same.

PRIOR ART

Hitherto, in the production of polymer electrolytes, various polymers such as polyethylene oxide, polyvinylidene fluoride, polyacrylonitrile, etc. or monomers which are polymerized with radical polymerization initiators or the irradiation of UV rays are used as gelation agents to gel liquid electrolytes.

However, polyethylene oxide, polyvinylidene fluoride or polyacrylonitrile requires heating to gel the liquid electrolytes. During the heating step, the electrolyte salts may be decomposed. In addition, such polymers have high viscosity and therefore their workability is low.

When the monomers are polymerized with the radical polymerization initiators, heating is usually necessary, and it takes a long time until the polymerization reaction is completed. In addition, the polymerization may not be carried out in the air since radicals are deactivated with oxygen. When the monomers are polymerized with the irradiation of UV ray, the polymerization may proceed at room temperature but it is difficult to produce polymers having the same properties required at any time in a dry air because of the generation of radicals. In addition, the monomers used are mostly polyfunctional, and thus the polymers generated usually becomes fragile easily.

SUMMARY OF THE INVENTION

One object of the present invention is to develop a polymer which can be quickly prepared at room temperature in a dry air and is used as a gelation agent for the preparation of a polymer electrolyte.

Another object of the present invention is to provide a polymer electrolyte which can be easily prepared and prevent the liquid leakage from electrochemical equipment.

A further object of the present invention is to provide a rechargeable cell comprising a polymer electrolyte, which can avoid the liquid leakage.

Accordingly, the present invention provides a polymer electrolyte comprising an electrolyte salt, a non-aqueous solvent, and a polymer as a gelation agent which comprises repeating units of the formulas:

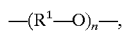

and

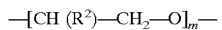

wherein n is 0 or a positive number (n≧0) and m is 0 or a positive number (m≧0) provided that the sum of n and m is at least 5 (n+m≧5), $R^1$ is an alkyl group having 1 to 6 carbon atoms, and $R^2$ is an alkyl group having 1 to 6 carbon atoms or a benzyl group, and a urea structure of the formula (I):

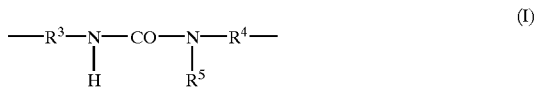

in which $R^3$ and $R^4$ are the same or different and represent, an alkyl group having 1 to 6 carbon atoms or a hydrocarbon group comprising an aromatic group and having 7 to 11 carbon atoms in total, and $R^5$ is a hydrogen atom, an alkyl group having 1 to 6 carbon atoms or a hydrocarbon group comprising an aromatic group and having 7 to 11 carbon atoms in total, which may be prepared by polymerization through the reaction of an amine compound and a urethane.

Furthermore, the present invention provides a rechargeable cell comprising a positive electrode, a negative electrode and a film of the polymer electrolyte of the present invention, which is interposed between the positive and negative electrodes.

The polymer contained in the polymer electrolyte of the present invention has a decreased crystallinity and a low glass transition temperature because of the introduction of, for example, propylene oxide segments in ethylene oxide segments. Therefore, such a polymer itself has a good ion conductivity even at or below room temperature in comparison with the conventional polymer gelation agents.

Furthermore, the retention of the liquid electrolyte can be controlled by the adjustment of the ratio of the ethylene oxide segments to the propylene oxide segments.

The above polymer used in the present invention is prepared by the polymerization through the reaction of an amine compound and a urethane. This reaction can be carried out in a dry air since it is a polyaddition reaction in which no radicals are generated as intermediates. Thus, the production process of the polymer electrolyte can be simplified.

In addition, the reaction of the active hydrogen of the amine and the isocyanate group of the urethane can be carried out at room temperature, since it proceeds very quickly. The reaction rate can be controlled easily using the difference of the reactivity of a primary amine, a secondary amine and a polyamine and/or the content of the amino group.

In the polymer structure of the present invention, the structures represented by —($R^1$—O)$_n$—, and —[CH($R^2$)—CH$_2$—O]$_m$— are derived from either the amine compound or urethane. The group R3 in the urea structure represented by the formula (I) is derived from the urethane, while R4 and R5 are derived from the amine compound. Thus, those having the above structures are selected as the amine comound and the urethane to synthesize the polymer used in the present invention.

DETAILED DESCRIPTION OF THE INVENTION

The amine compound used is preferably a primary amine, a secondary amine or polyaminoamide having a polymeric chain of an alkylene oxide, or their derivatives, which preferably has at least two amino groups. Specific examples of such an amine compound include Jeffamine (trade name)

comprising polypropylene glycol the both terminals of which are changed to amine groups, diethylene glycol bispropylamine comprising a linear aliphatic diamine into which an ether group is introduced $[H_2N(CH_2)_pO(CH_2CH_2O)_q—(CH_2)_p—NH_2]$, etc.

Preferably, the urethane is an aliphatic urethane, an alicyclic urethane, an aromatic urethane or derivatives thereof with a compound comprising polymeric alkylene oxide chain. Preferably, the urethane has at least two isocyanate groups. Specific examples of such a urethane include 2,4-tolylene diisocyanate (TDI), 4,4'-diphenylmethane diisocyanate (MDI), dianisidine diisocyanate, tolylene diisocyanate, m-xylene diisocyanate, hexamethylene diisocyanate, polymethylenepolyphenyl polyisocyanate, and their addition products with polyols.

Examples of the electrolyte salt are halides and perchlorates of alkali metals, perchlorates of alkaline earth metals, salts of fluorine-containing compounds such as salts of trifluoromethanesulfonic acid, and mixtures thereof. Specific examples of such an electrolyte salt include sodium fluoride, sodium chloride, sodium iodide, lithium bromide, lithium perchlorate, lithium trifluoromethanesulfonate, lithium tetraborofluoride, lithium bistrifluoromethylsulfonylimide, lithium thiocyanate, magnesium perchlorate, magnesium trifluoromethanesulfonate, sodium tetraborofluoride, etc.

Specific examples of the non-aqueous solvent include ethylene carbonate, propylene carbonate, γ-butyrolactone, dimethoxyethane, dimethylsulfoxide, dioxolane, sulfolane, methylethyl carbonate, etc. They may be used singly or in a mixture.

The polymer electrolyte of the present invention may be produced by any preparation method used to produce conventional polymer electrolytes using the above components.

Also the amounts of the polymer, the electrolyte salt and the non-aqueous solution may be the same as those for the conventional polymer electrolytes.

The rechargeable cell of the present invention has the same construction as that of the conventional rechargeable cell comprising a polymer electrolyte. That is, the rechargeable cell comprises a positive electrode, a negative electrode, and the film of the polymer electrolyte of the present invention.

The active material of the positive electrode can be lithium-containing composite oxides such as lithium cobalt composite oxides (e.g. $LiCoO_2$, etc.), lithium manganese composite oxides (e.g. $LiMn_2O_4$, etc), lithium nickel composite oxides (e.g. $LiNiO_2$, etc.), and those derivatives in which a part of the metals are replaced with other metals (e.g. $LiNi_{0.7}Co_{0.2}Al_{0.1}O_2$, etc.) Other metal oxides (e.g. manganese dioxide, vanadium pentoxide, chromium oxide, etc.) or metal sulfides (e.g. titanium disulfide, molybdenum disulfide, etc.) are also usable as the active material of the positive electrode. Furthermore, sulfur element (e.g. polysulfur) or organic sulfur compounds having a disulfide bond may be used as the active material of the positive electrode.

The positive electrode may be prepared by any conventional method. For example, it can be prepared by adding optionally a binder (e.g. polyvinylidene fluoride, polytetrafluoroethylene, etc.) and conductive materials (e.g. flake-form graphite, acetylene black, carbon black, etc.) to the active material of the positive electrode to obtain a positive electrode mixture, then adding a dispersion solvent to the mixture to form a uniform paste, applying the paste on a positive electrode collector (e.g. an aluminum or nickel foil, etc.) and drying the applied paste to form the layer of the positive electrode mixture on at least a part of the positive electrode collector. The binder may beforehand be dissolved in a solvent and then mixed with the active material of the positive electrode and so on.

Examples of an active material of the negative electrode include metal lithium or lithium alloys, carbonaceous materials such as graphite, cokes, mesocarbon microbeads, carbon fiber, activated carbon, etc., alloys or oxides of Si, Sn, In, etc., lithium-containing composite nitrides (e.g. $Li_{2.6}Co_{0.4}Ni_{0.1}N$, etc.), and so on. Among them, metal lithium, the lithium alloys, and the lithium-containing composite nitrides are preferably used to design high capacity cells.

The negative electrode may be produced by any conventional method. For example, it can be produced by adding optionally the conductive material and the binder to the active material of the negative electrode like in the production of the positive electrode to obtain a negative electrode mixture, dispersing the negative electrode mixture in a solvent to form a uniform paste by stirring, applying the paste on a negative electrode collector (e.g. a copper foil, etc.) and drying the applied paste to form the layer of the negative electrode mixture on at least a part of the negative electrode collector. The binder may be beforehand dissolved in a solvent and then mixed with the active material of the negative electrode and so on.

EXAMPLES

The present invention will be illustrated by the following Examples, which do not limit the scope of the present invention in any way.

In the Examples, all the procedures were done in a dry air with a dew point below −60° C.

Example 1

Jeffamine XTJ-502 (trade name) (an amine compound; Active Hydrogen Equivalent Weight (AHEW)=525; manufactured by Huntsman Corporation, USA) (100 g) was dissolved in PC/EC (1/1 wt) (130 g). To the solution, an epoxy resin (SR-8EG manufactured by Sakamoto Yakuhin Kabushikikaisha; Epoxy equivalent weight=290) (25.2 g) was added and reacted at room temperature for 7 days while stirring. "PC/EC (1/1 wt)" means a mixture of propylene carbonate (PC) and ethylene carbonate in a weight ratio of 1:1.

Jeffamine XTJ-502 is a compound of the formula:

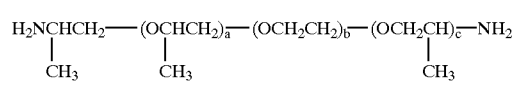

wherein b is 39.5 on the average, and a +c is 5.0 on the average.

The epoxy resin SR-8EG is a compound of the formula:

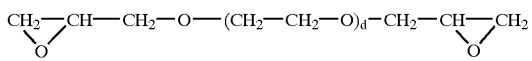

wherein d is 8.

Jeffamine XTJ-501 and the epoxy resin SR-8EG react as follows:

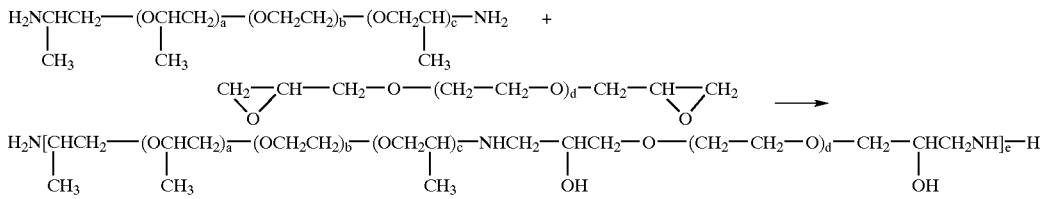

in which a, b, c and d are the same as defined above, and e is 2.2 on the average.

To the transparent solution, which had been prepared by the reaction of Jeffamine XTJ-503 and the epoxy resin SR-8EG, $LiCF_3SO_3$ was added so that its concentration became 1 mol /l, and then stirred until $LiCF_3SO_3$ was dissolved uniformly.

Separately, a urethane (AX-1043 (trade name) manufactured by Mitsui Chemicals, Inc.; —NCO content: 8.60%) was dissolved in the 1 mol/l solution of $LiCF_3SO_3$ in MEC/EC (2/1 wt), which means a mixture of methyl ethyl carbonate (MEC) and ethylene carbonate (EC) in a weight ratio of 2:1.

The above two solutions were mixed so that the molar ratio of the active hydrogen to the NCO group was 1.1:1.0, and a non-woven fabric having a thickness of 80 μm was dipped in the above mixture of the two solutions. Then, the non-woven fabric impregnated with the mixture was degassed and kept standing for 2 hours.

After the polymer content in the obtained flexible film of the polymer electrolyte was adjusted to 50% and the concentration of $LiCF_3SO_3$ in the film was adjusted to 1 mol/l, the ion conductivity measured at room temperature was $2.0 \times 10^{-3}$ $S.cm^{-1}$. Then, the film was used in Example 6 to assemble a cell.

Example 2

A film of a polymer electrolyte was produced in the same manner as in Example 1 except that Jeffamine XTJ-502 (100 g) and the epoxy resin SR-8EG (25.2 g) were loaded in a flask and heated at 80° C. for 6 hours, then the solution of $LiCF_3SO_3$ in PC/EC (1/1 wt) (150 g) was added followed by cooling to room temperature and the mixture was crosslinked with the urethane.

With the formed film of the polymer electrolyte, the ion conductivity was measured at room temperature after the polymer content was adjusted to 50%, and the concentration of $LiCF_3SO_3$ was adjusted to 1 mol/l. The ion conductivity was $2.0 \times 10^{-3}$ $S.cm^{-1}$.

Example 3

A film of a polymer electrolyte was produced in the same manner as in Example 2.

With the formed film of the polymer electrolyte, the ion conductivity was measured at room temperature after the polymer content was adjusted to 12.5%, and the concentration of $LiCF_3SO_3$ was adjusted to 1 mol/l. The ion conductivity was $4.8 \times 10^{-3}$ $S.cm^{-1}$.

Example 4

A film of a polymer electrolyte was produced in the same manner as in Example 1 except that Jeffamine D-400 (an amine compound manufactured by Huntsman Corporation, USA; AHEW=100) (100 g) and the epoxy resin SR-8EG (145 g) were mixed and reacted at 80° C. for 6 hours, then the 1 mol/l solution of $LiCF_3SO_3$ in PC/EC (1/1 wt) (245 g) and further $LiCF_3SO_3$ was added to adjust the concentration of $LiCF_3SO_3$ to 1 mol/l followed by cooling to room temperature.

With the formed film of the polymer electrolyte, after the polymer content was adjusted to 50%, and the concentration of the electrolyte $LiCF_3SO_3$ was adjusted to 1 mol/l, the ion conductivity was measured at room temperature. The ion conductivity was $1.4 \times 10^{-3}$ $S.cm^{-1}$.

Jeffamine D-400 is a compound of the formula:

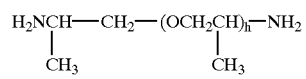

wherein h is 5.6 on the average.

Example 5

The 1 mol/l electrolyte solution of $LiCF_3SO_3$, in which 10% of Jeffamine XTJ-502 was dissolved, was directly added to the electrolyte solution of the urethane prepared in Example 1 and stirred. Then, the mixed solution was quickly applied to the glass plate to form a sheet of the polymer electrolyte. With this method, the film of the polymer electrolyte can be produced in a short time.

Example 6

A rechargeable cell was assembled using the polymer electrolyte of Example 1 and the following positive and negative electrodes.

Flake-form graphite as a conductive material was added to $LiCoO_2$ in a weight ratio of 100:6 ($LiCoO_2$ to graphite). Then, this mixture (940 g), a 12% solution of polyvinylidene fluoride in N-methyl-2-pyrrolidone (NMP) (500 ml) and NMP (400 ml) were mixed to obtain a paste containing the positive electrode mixture. This paste was filtrated through a stainless steel net to remove coagulates. Then, the paste was uniformly applied on the both surfaces of a positive electrode collector consisting of an aluminum foil having a thickness of 15 μm and containing 1% (by weight) of iron and 0.15% of silicon so that the dry weight of the positive electrode mixture was 24.6 mg/cm², and dried to form the layer of the positive electrode mixture. Thereafter, this layer was pressed with a roll press, and the aluminum foil carrying the layers of the positive electrode mixture was cut to obtain a positive electrode sheet with a required size. Then, a lead was welded to the sheet to obtain a positive electrode.

Separately, mesocarbon microbeads (920 g), which had a spacing of 0.337 nm between the (002) planes, a crystal size of 95.0 nm in the c-axis direction, an average particle size of 15 μm and a purity of higher than 99.9%, were mixed with NMP (900 ml) and a 12% solution of polyvinylidene fluoride in NMP (670 ml) to obtain the paste of the negative electrode mixture. This paste was filtrated through a stainless steel net to remove coagulates. Then, the paste was uniformly applied on the both surfaces of a negative electrode collector consisting of a copper foil having a thickness of 10 μm so that the dry weight of the negative electrode mixture was 12.0 mg/cm², and dried to form the layer of the negative electrode mixture. Thereafter, this layer was pressed with a roll press, and the aluminum foil carrying the layers of the positive electrode mixture was cut to obtain a sheet with a required size. Then, a lead was welded to the sheet to obtain a negative electrode.

The surfaces of the positive and negative electrodes were slightly wetted with an electrolyte solution (a 1.0 mol/l solution of LiCF₃SO₃ in MEC/EC (2/1 wt)). Then, the positive and negative electrodes were wound with inserting the film of the polymer electrolyte, which was produced in Example 1, between the electrodes to obtain the wound electrode body.

The wound electrode body was inserted in a cylindrical cell case, and the leads of the positive and negative electrodes were welded to the cell case. Then, the cap of the cell case was sealed, and the electrode body was pre-charged and aged to obtain a cylindrical rechargeable cell.

Comparative Example

A film-form polymer electrolyte having a conventional structure was produced as follows:

Triethylene glycol dimethacrylate (220 g), 2-ethoxyacrylate (8.5 g) and ethylene glycol ethyl carbonate methacrylate (5.6 g) were dissolved in a 1.22 mol/l solution of LiPF₆ in PC/EC (1/1 wt) (1.4 kg). In addition, benzoyl peroxide (20 g) was dissolved in the solution.

A non-woven fabric of polybutylene terephthalate was impregnated with the above solution, placed in the frame of a polyethylene sheet having a thickness of 80 μm, and pressed at 80° C. under a pressure of 45 kg/cm² for 10 minutes, followed by cooling. Then, the non-woven fabric was removed from the frame and cut to a designed size to obtain a polymer electrolyte.

All the above procedures were carried out in a dry atmosphere having a dew point of lower than −60° C. The obtained polymer electrolyte had an ion conductivity of 1.0×10⁻³ S.cm⁻¹.

A rechargeable cell was produced in the same manner as in Example 6 except that the above polymer electrolyte was used.

With the rechargeable cells of Example 6 and Comparative Example, a discharge capacity was measured and an ignition test was carried out by the following methods:

Discharge Capacity

A discharge capacity was measured by charging and discharging the cell at a current of 300 mA in a voltage range of 2.75 V and 4.1 V.

Ignition Test

Ten cells of Example 1 or Comparative Example were charged to a voltage of 4.18 V and maintained in a constant temperature vessel at 45° C. for 4 hours. Then, each cell was pierced with a stainless steel nail having a diameter of 3 mm from the peripheral surface to the center of the cell using a tool, and the number of the cells ignited was counted to evaluate the ignition property.

The results are shown in the Table.

TABLE

| | Discharge Capacity (mAh) | No. of ignited cells |
|---|---|---|
| Example 6 | 1,400 | 0 |
| Comparative Example | 1,200 | 1 |

As can be seen from the results in the Table, the cell of Example 6 had the higher discharge capacity than that of Comparative Example which used the conventional polymer electrolyte. In addition, the cells of Example 6 had the better safety since they were not ignited when the internal short circuit was formed by the nail penetration. This is because the polymer electrolyte used in the cells of Example 6 could be easily produced at room temperature and had the good uniformity.

What is claimed is:

1. A polymer electrolyte comprising an electrolyte salt, a non-aqueous solvent and a polymer which comprises repeating units of the formulas:

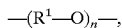

and

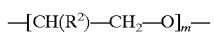

wherein n is 0 or a positive number (n≧0) and m is 0 or a positive number (m≧0) provided that the sum of n and m is at least 5 (n+m≧5), R¹ is an alkyl group having 1 to 6 carbon atoms, and R² is an alkyl group having 1 to 6 carbon atoms or a benzyl group, and a urea structure of the formula (I):

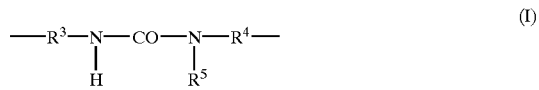

(I)

in which R³ and R⁴ are the same or different and represent, an alkyl group having 1 to 6 carbon atoms or a hydrocarbon group comprising an aromatic group and having 7 to 11 carbon atoms in total, and R⁵ is a hydrogen atom, an alkyl group having 1 to 6 carbon atoms or a hydrocarbon group comprising an aromatic group and having 7 to 11 carbon atoms in total.

2. The polymer electrolyte according to claim 1, wherein said polymer is prepared through the reaction of an amine compound and a urethane, and said amine compound is at least one compound selected from the group consisting of a primary amine, a secondary amine, polyaminoamide having a polymeric chain of an alkylene oxide, and their derivatives, which has at least two amino groups.

3. The polymer electrolyte according to claim 1, wherein said polymer is prepared through the reaction of an amine compound and a urethane, and said urethane is at least one compound selected from the group consisting of an aliphatic urethane, an alicyclic urethane, an aromatic urethane or derivatives thereof with a compound comprising polymeric alkylene oxide chain, which has at least two isocyanate groups.

4. The polymer electrolyte according to claim 1, wherein said electrolyte salt is at least one salt selected from the group consisting of perchlorates of alkali metals, perchlorates of alkaline earth metals and salts of fluorine-containing compounds.

5. The polymer electrolyte according to claim 1, wherein said solvent is a non-aqueous organic solvent.

6. A rechargeable cell comprising a positive electrode, a negative electrode, and a film of the polymer electrolyte according to claim 1, which is interposed between said positive and negative electrodes.

7. The polymer electrolyte according to claim 5, wherein said organic solvent is at least one solvent selected from the group consisting of ethylene carbonate, propylene carbonate, γ-butyrolactone, dimethoxyethane, dimethylsulfoxide, dioxolane, sulfolane and methylethyl carbonate.

8. A rechargeable cell comprising a positive electrode which contains a lithium-containing composite oxide as an active material, a negative electrode, and a polymer electrolyte according to claim 5 or 7 which is interposed between said positive electrode and said negative electrode.

9. A rechargeable cell comprising a positive electrode, a negative electrode which contains a carbonaceous material as an active material, and a polymer electrolyte according to claim 5 or 1 which is interposed between said positive electrode and said negative electrode.

* * * * *